May 23, 1967 R. S. CHALLENDER 3,321,373
NUCLEAR REACTOR CONTROL MECHANISMS
Filed Dec. 16, 1965 5 Sheets-Sheet 2

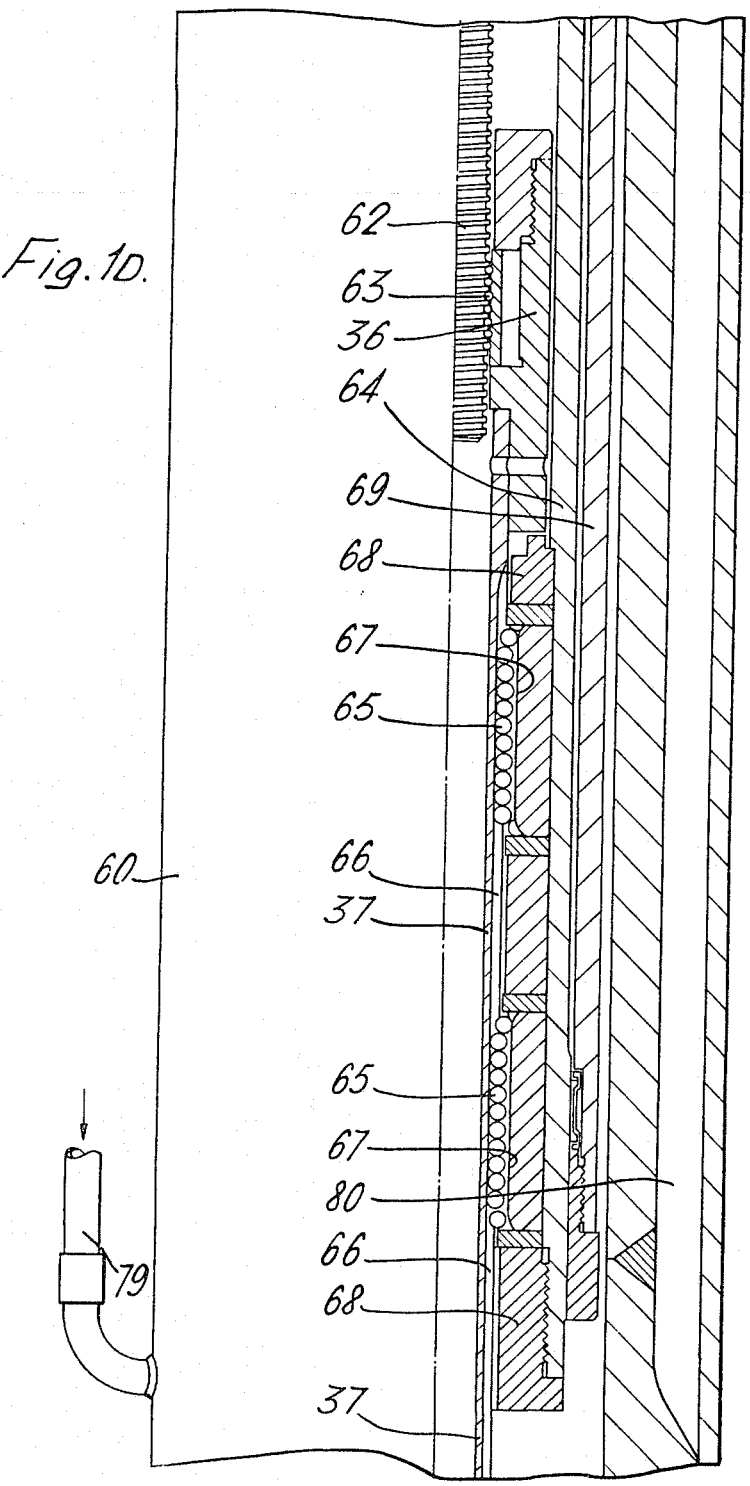

United States Patent Office 3,321,373
Patented May 23, 1967

3,321,373
NUCLEAR REACTOR CONTROL MECHANISMS
Ronald Scott Challender, Appleton, Warrington, England, assignor to United Kingdom Atomic Energy Authority, London, England
Filed Dec. 16, 1965, Ser. No. 514,327
Claims priority, application Great Britain, Mar. 17, 1965, 11,313/65
6 Claims. (Cl. 176—36)

This invention relates to nuclear reactor control mechanisms.

Two forms of control are customarily provided in nuclear reactors, namely normal operational control and emergency control. Normal operational control involves slow movement of control rods relative to a reactor core, whereas emergency control calls for rapid movement of control rods in a direction to reduce reactivity of the core. Space and economic considerations make it advantageous in some reactor systems to provide one set of control rods to serve for both forms of control and to design control mechanisms so as to cater for the different speed requirements of the two forms. It is with this type of control mechanism that the present invention is concerned.

In one of its aspects, the present invention resides in a nuclear reactor control mechanism for normal control movement of a control rod relative to a reactor core and releasable to allow for rapid movement of the rod in a direction to reduce reactivity of the core, the mechanism comprising a drive member engaging a driven member, first means for restraining the driven member against rotation during normal control movement, a releasable mechanical coupling between the driven member and a control rod carrier, and second means for effecting limited rotation of the driven member to release the coupling so as to allow for rapid movement of the carrier in the direction to reduce reactivity of the core, one of said means utilising spring loading and the other utilising fluid pressure opposing the spring loading.

Preferably one of said members is in the form of a nut and the other in the form of a screw.

Figure 1A:
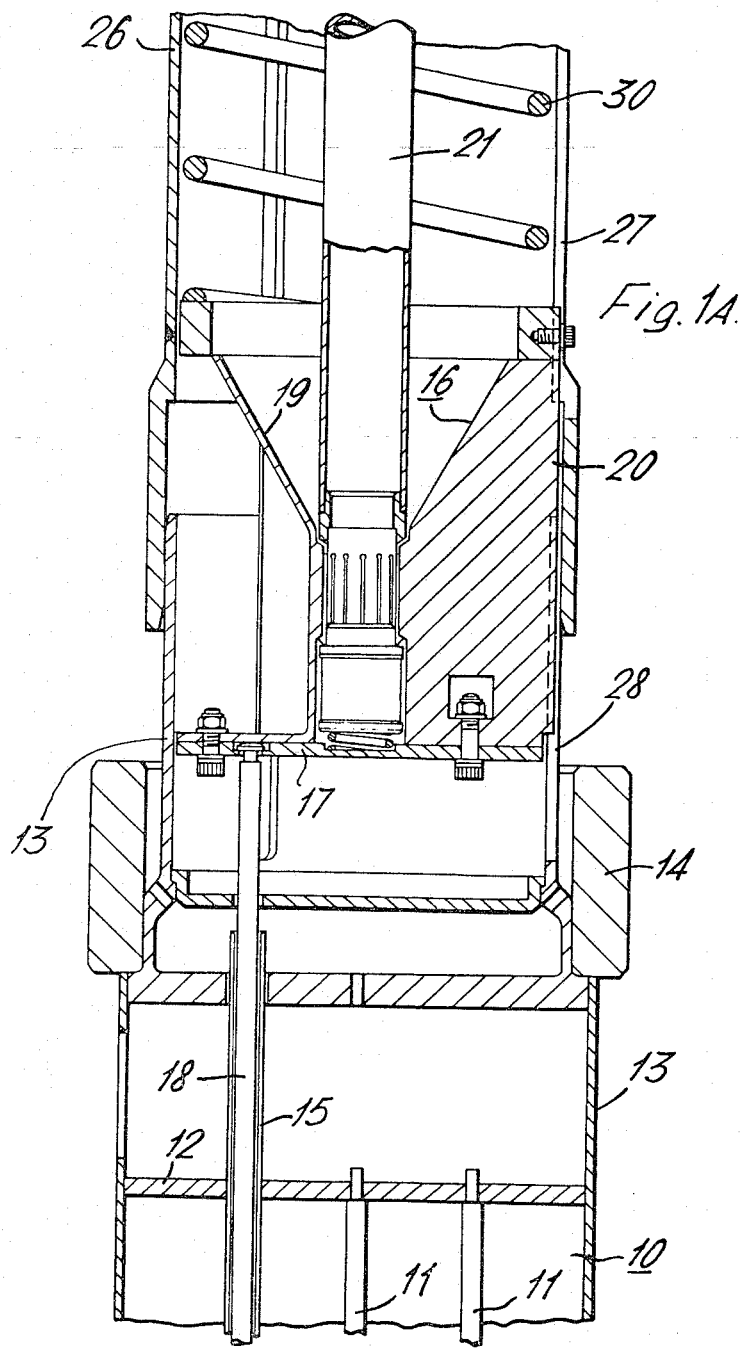
Figure 1B:
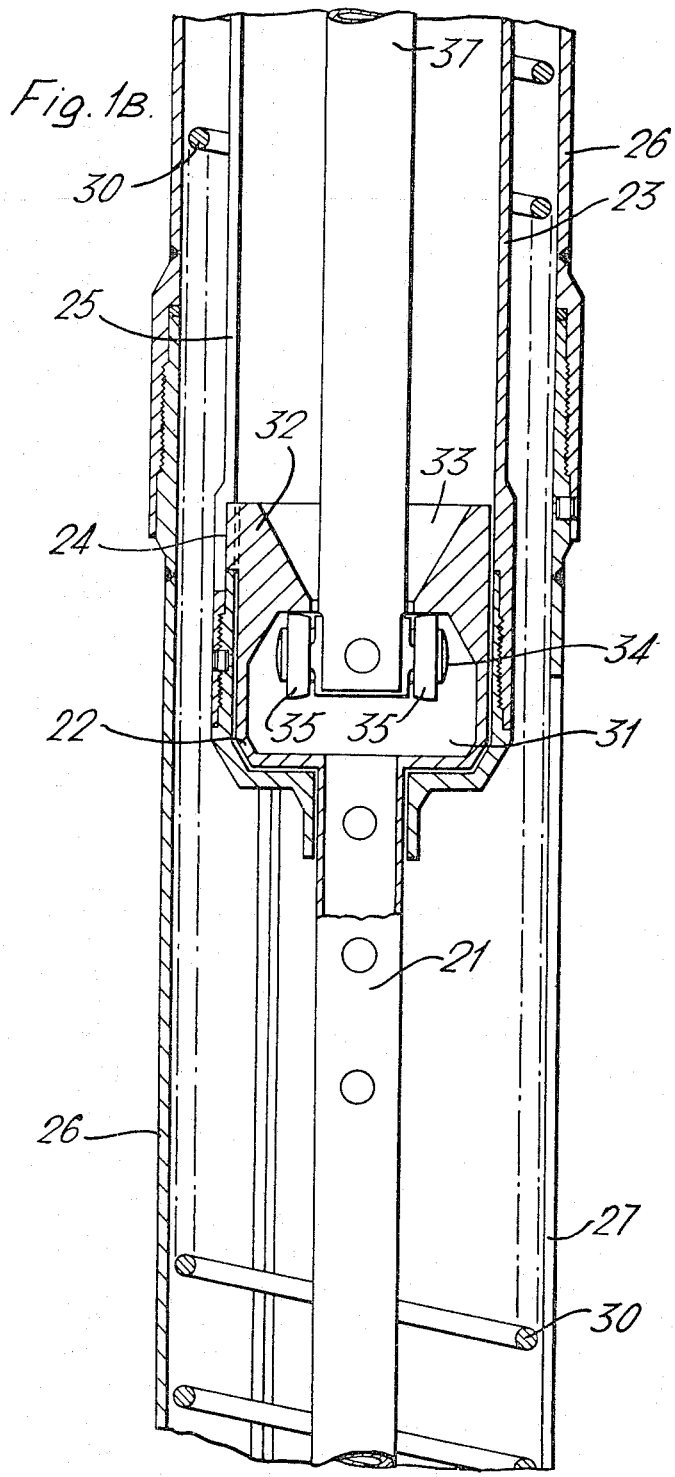
Figure 1C:
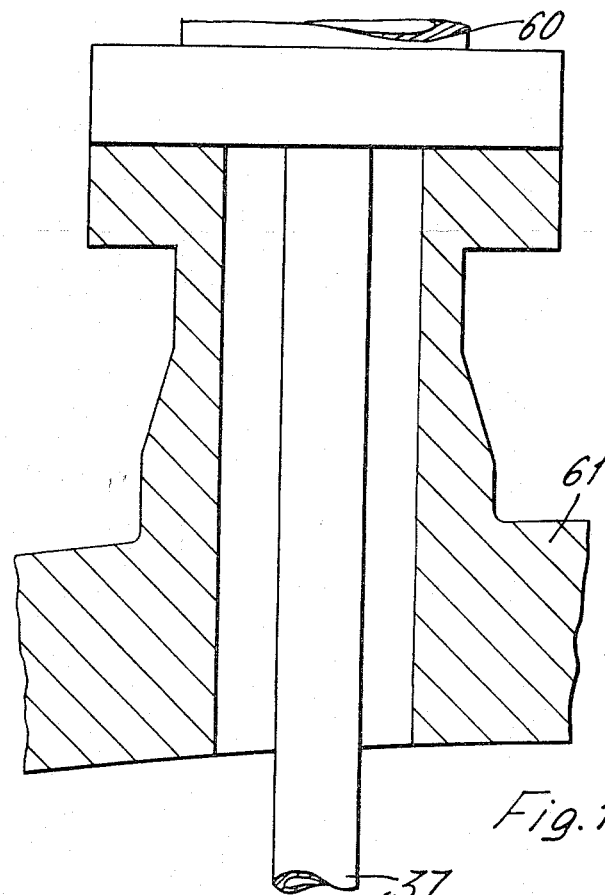
Figure 1C:
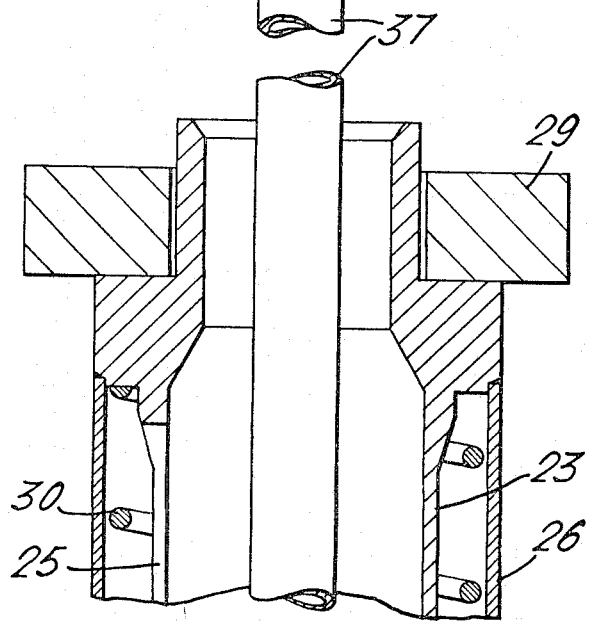
Figure 1E:
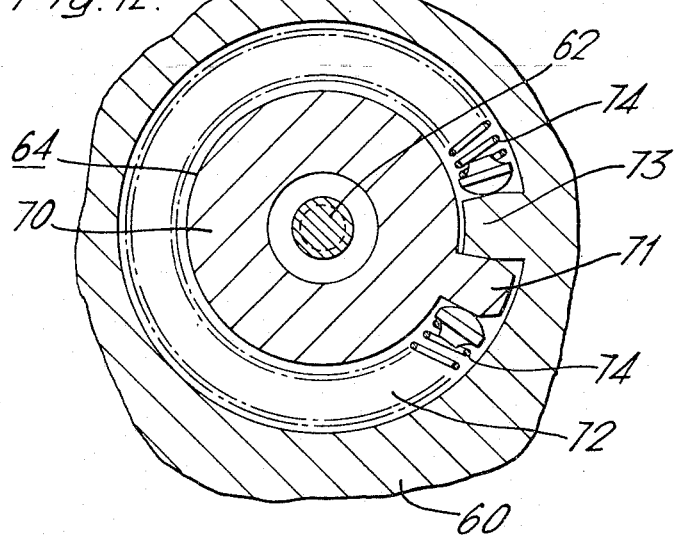
Figure 1F:
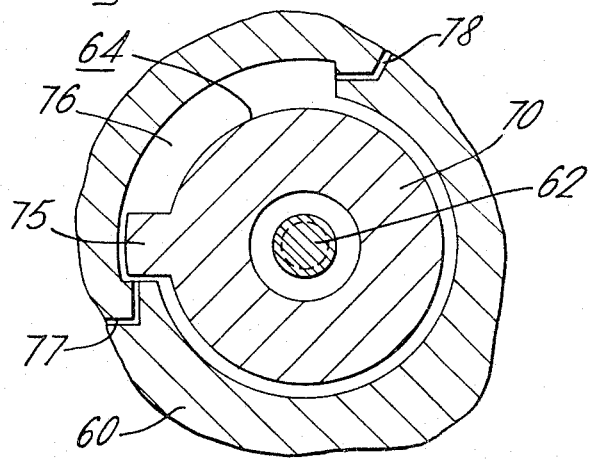

In the accompanying exemplifying drawings, FIGURES 1A to 1D show in sectional elevation four successive portions from a lower to an upper end regions of one embodiment of nuclear reactor control mechanism in accordance with the invention, the scale of FIGURE 1D differing from that of FIGURES 1A to 1C, and FIGURES 1E and 1F are transverse sectional views (to a different scale) at the upper end region of the mechanism.

The invention is described below by way of example with reference to a pressurised water reactor having a reactor core comprising a number of similar fuel element assemblies, each such assembly having an associated control mechanism. As shown in the drawings, each fuel assembly 10 comprises a number of upright fuel pins 11, typically of uranium oxide in stainless steel sheaths, fixed in position between spacer plates (one of which is shown and designated 12) supported in a tubular fuel element shroud 13 located between an upper core support grid 14 and a lower core support grid housed in a reactor pressure vessel. Disposed symmetrically within the shroud 13 are a number of upright guide tubes 15. The associated control mechanism comprises a control rod carrier 16 disposed above the fuel pins 11 and guide tubes 15, the carrier 16 having a plate 17 supporting a control rod formed by a number of upright control pins 18, typically of neutron absorber material such as boron steel, which are flexibly linked to the plate 17 and extend into the guide tubes 15. To the plate 17 a part-conical tube 9 is connected by bolts, the tube 19 having three equi-spaced radially disposed plates effectively forming keys 20 and to the tube 19 is coupled the lower end of a tubular member 21 of the carrier, the upper end 22 of the tubular member 21 being enlarged to serve as a damping piston movable axially in a coaxial damping tube 23, the piston having a key 24 engaging in a longitudinal keyway 25 in the inner wall of the damping tube 23. Disposed round the tubular member 21 of the carrier and the damping tube 23 is a coaxial main tube 26 of the control mechanism, this main tube 26 being keyed at its lower end to the upper end of the fuel element shroud, the keys 20 engaging keyways 27, 28 in the tube 26 and shroud 13 respectively. The upper ends of the damping tube 23 and the main tube 26 are located by a control mechanism support grid 29 carried from the reactor vessel. Disposed coaxially in the annulus between the main tube 26 and the damping tube 23 and tubular member 21 is a main helical scram spring 30 effectively extending between the control mechanism support grid 29 and the carrier 16. The enlarged end 22 of the tubular member 21 serving as a damping piston is shaped to form one part of a releasable mechanical coupling, this part having a wall defining a circular socket 31 with upper flanges 32 defining a diametral slot 33 giving access to the socket. The other part of the releasable mechanical coupling is formed by a hammerhead, or in other words a transverse shaft 34, on the lower end of a driven member, and for engagement of the coupling the hammerhead is inserted through the diametral slot and rotated through 90° for rollers 35 on the shaft 34 to engage the underside of the flanges 32. The driven member is conveniently in the form of a nut member having a nut 36 and an integral nut extension tube 37 at the lower end of which the hammerhead is provided.

The nut 36 is housed in a main control mechanism body 60 outside and above the vessel, and the nut extension tube 37 extends downwardly from the nut 36 to pass through a port of a lid 61 of the vessel, the lower end of the control mechanism body 60 being sealed to the lid 61 around the port. The nut engages a drive member in the form of a screw member 61, the engagement preferably being of the recirculating ball 63 type. The screw member 62 is mounted for rotation within the control mechanism body and at its upper end is secured to a drive shaft of a glandless reluctance motor mounted on the upper end of the control mechanism housing body 60.

The nut extension tube 37 is keyed to the lower end of a restraint member in the form of an elongate restraint tube 64, the keying preferably being by way of balls 65 engaging in longitudinally extending grooves 66 formed in the outer surface of the nut extension tube 37 and longitudinal grooves 67 formed in the inner surface of the restraint tube 64. The balls 65 are retained by keeper rings 68 at the ends of the grooves 67 in the restraint tube 64 which are of limited length as compared with the grooves 66 in the nut extension tube 37. The restraint tube 64 is coaxially disposed around and spaced from the screw member 62 and nut extension tube 37, and extends upwardly within a fixed sleeve 69 in the control mechanism body 60 to terminate with its upper end below the electric drive motor. Adjacent its upper end the restraint tube 64 has a stepped portion 70 having on its outer surface a radially outward projecting stop 71 extending into a circumferential groove 72 formed in the inner surface of the control mechanism body 60. The body 60 also has a stop 73 extending radially inward into the circumferential groove 72, and spring means in the form of an auxiliary coil spring 74 extending round the restraint tube acts between the stop 72 on the body and the stop 71 on the restraint tube normally to hold the stops in abutting relationship.

Below the level of the stops 71, 73, the stepped portion 70 of the restraint tube has a radially outward projecting blade 75 or vane shown extending into one end region of a part-circumferential (e.g. 90°) groove 76 formed in the inner surface of the control mechanism body 60, and the body is formed with two valved ducts or ports 77, 78 communicating respectively with the two ends of the part-circumferential groove 76.

Immediately above and below its stepped portion, the restraint tube 64 is mounted from the control mechanism body 60 and sleeve 69 respectively by way of ball bearing allowing rotation of the restraint tube about its longitudinal axis when required.

The body 60 has a lower inlet 79 leading to, and an upper outlet leading from an annulus 80 for the flow of coolant to cool the balls 63, 65.

During assembly the hammerhead 34 is lowered to approach the diametral slot 33. The hammerhead is aligned to enter the slot by momentarily opening the ports 77, 78 in the body to sources of high and low pressure fluid respectively so that the pressure difference across the blade 75 rotates the blade from the position shown through the 90° arc of the part-circumferential groove 76. In this way the restraint tube 64 and hence the nut extension tube 37 are also rotated through 90°, the stop 71 moving away from the stop 73 against the loading of the spring 74. After the hammerhead has entered the diametral slot, the ports 77, 78 in the body are closed and the spring loading of the auxiliary spring 74 acting between the stops 71, 73 rotates the restraint tube 64 and the nut extension tube 39 through 90° in the opposite direction so that the hammerhead 34 is similarly rotated to engage the coupling as described above, the stop 71 and blade 75 returning to the positions shown.

During normal reactor operation, normal control is effected by drive motor rotation of the screw member 62 which causes longitudinal or axial movement of the nut 36 and nut extension tube 37 since these are normally restrained against rotation by virtue of the keying arrangement between the nut extension tube 37 and the restraint tube 64. Thus the carrier 16 and the control pins 18 are moved relative to the fuel pins 11 of the core for regulated control of the core reactivity. The part-circumferential groove 76 is exposed to reactor coolant at high pressure, and for emergency control the port 78 in the body furthest from the shown position of the blade 75 is opened to a low fluid pressure sump so that the fluid pressure difference acting across the blade 75 in opposition to the spring loading of the spring 74 acting between the stops 71, 73 causes the blade 75 rapidly to rotate through 90°. Thus the restraint tube 64, nut 36 and nut extension tube 37 are similarly rotated, thereby rotating the hammerhead 34 to release the coupling. The carrier 16 is then free for rapid movement under the action of gravity and the normally compressed main spring 30 in a direction to reduce reactivity of the core, that is in a downward direction inserting the control pins 18 carried by the carrier 16 between the fuel pins 11. The damping piston and damping tube 23 serve to absorb the energy of movement at the end of the movement that is to say with the control pins 18 fully inserted in the guide tubes 15 between the fuel pins 11 of the reactor core in a position of maximum control effect.

The arrangement whereby the nut extension tube, and hence the nut, is keyed to the restraint tube which is normally held against rotation by spring loading can be considered to constitute first or restraint means for restraining the driven (nut) member against rotation during normal control movement, whilst the arrangement whereby the restraint tube and its keyed nut is rotated through 90° by fluid pressure opposing the spring loading can be considered to constitute second or drive means for effecting limited rotation of the driven (nut) member to release the coupling.

The arrangement described above by way of example has flexibility in operation and avoids the use of a gland. In fact the canned reluctance motor is exposed to the pressure of the reactor coolant, which latter effectively serves as the high pressure fluid source thus giving a high torque for rapid rotational movement for emergency control purposes.

The invention is not limited to the details described above by way of example. Thus more than one auxiliary spring may be used for the spring loading of the restraint tube, and similarly the restraint tube may have more than one blade. Thus for example there may be two diametrically opposed blades and correspondingly two part-circumferential grooves in the body. The mechanism of the invention may be disposed for horizontal operation or alternatively may be positioned below the reactor core instead of above the core as described in the above example.

I claim:

1. A nuclear reactor control mechanism for normal control movement of a control rod relative to a reactor core and releasable to allow for rapid movement of the rod in a direction to reduce reactivity of the core, the mechanism comprising a drive member engaging a driven member, first means for restraining the driven member against rotation during normal control movement, a releasable mechanical coupling between the driven member and a control rod carrier, and second means for effecting limited rotation of the driven member to release the coupling so as to allow for rapid movement of the carrier in the direction to reduce reactivity of the core, one of said means utilising spring loading and the other utilising fluid pressure opposing the spring loading.

2. A nuclear reactor control mechanism as claimed in claim 1, wherein the first means comprises a restraint member keyed to the driven member and spring means for holding the restraint member against rotation during normal control movement.

3. A nuclear reactor control mechanism as claimed in claim 2, wherein the second means comprises a blade on the restraint member and means for applying fluid pressure to the blade to effect limited rotation of the restraint member.

4. A nuclear reactor control mechanism as claimed in claim 3, wherein the spring means extends between a stop on the restraint member and a stop on a housing for the restraint member.

5. A nuclear reactor control mechanism as claimed in claim 4, wherein the drive member comprises a screw and the driven member comprises a nut engaging the screw and carrying a nut extension tube.

6. A nuclear reactor control mechanism as claimed in claim 5, wherein the restraint member is of tubular form coaxially disposed around the nut extension tube.

References Cited by the Examiner

UNITED STATES PATENTS

| 3,079,323 | 2/1963 | Hawke | 176—36 |
| 3,089,839 | 5/1963 | Hawke et al. | 176—36 |
| 3,158,545 | 11/1964 | Jones | 176—36 |
| 3,170,844 | 2/1965 | Nicoll | 176—36 |

CARL D. QUARFORTH, *Primary Examiner.*

L. DEWAYNE RUTLEDGE, *Examiner.*

H. E. BEHREND, *Assistant Examiner.*